(12) United States Patent
Bialas et al.

(10) Patent No.: US 8,166,808 B2
(45) Date of Patent: May 1, 2012

(54) ENGINE HEATER USE DETECTION SYSTEMS AND METHODS

(75) Inventors: Daniel A Bialas, Ann Arbor, MI (US); Igor Anilovich, Walled Lake, MI (US); John W. Siekkinen, Novi, MI (US); Thomas F. Porlick, Brighton, MI (US)

(73) Assignee: GM Global Technology Operations LLC (US)

( * ) Notice: Subject to any disclaimer, the term of this patent is extended or adjusted under 35 U.S.C. 154(b) by 100 days.

(21) Appl. No.: 12/835,137

(22) Filed: Jul. 13, 2010

(65) Prior Publication Data

US 2012/0011925 A1    Jan. 19, 2012

(51) Int. Cl.
*G01M 15/00* (2006.01)

(52) U.S. Cl. .................................... 73/114.68

(58) Field of Classification Search ............... 73/114.68
See application file for complete search history.

(56) References Cited

U.S. PATENT DOCUMENTS

| | | | |
|---|---|---|---|
| 5,897,056 A * | 4/1999 | Morikawa et al. ....... 237/12.3 R |
| 6,282,895 B1 * | 9/2001 | Johansson et al. .............. 60/524 |
| 6,321,695 B1 * | 11/2001 | Yoo et al. .................... 123/41.15 |
| 7,873,464 B2 * | 1/2011 | Shartzer et al. ............... 701/113 |
| 2007/0044468 A1 * | 3/2007 | Ziph .............................. 60/520 |
| 2010/0251708 A1 * | 10/2010 | Ziph .............................. 60/522 |

* cited by examiner

Primary Examiner — Freddie Kirkland, III

(57) ABSTRACT

A diagnostic system includes a temperature derivative module and a heater use module. The temperature derivative module determines a derivative of a temperature of one of a fluid of an engine of a vehicle and a component of the engine measured by a temperature sensor after a vehicle startup event. The heater use module selectively indicates that an engine heater was used before the vehicle startup event based on the derivative.

20 Claims, 4 Drawing Sheets

US 8,166,808 B2

ENGINE HEATER USE DETECTION SYSTEMS AND METHODS

FIELD

The present disclosure relates to internal combustion engines and more particularly to engine heaters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The combustion process within an internal combustion engine generates a significant amount of heat. Excessive heat may reduce the reliability of the engine and/or engine components. Excessive heat may also shorten the lifetime (i.e., period of reliable use) of the engine and one or more of the engine components.

A vehicle that includes an internal combustion engine also includes a heat exchanger (e.g., a radiator) that is connected to coolant channels within the engine. A coolant pump circulates coolant and/or another suitable fluid through the coolant channels and the heat exchanger while the vehicle is running. The coolant absorbs heat from the engine and carries the heat to the heat exchanger. The heat exchanger facilitates the transfer of heat from the coolant within the heat exchanger to air passing the heat exchanger.

SUMMARY

A diagnostic system includes a temperature derivative module and a heater use module. The temperature derivative module determines a derivative of a temperature of one of a fluid of an engine of a vehicle and a component of the engine measured by a temperature sensor after a vehicle startup event. The heater use module selectively indicates that an engine heater was used before the vehicle startup event based on the derivative.

A diagnostic method includes: determining a derivative of a temperature of one of a fluid of an engine of a vehicle and a component of the engine measured by a temperature sensor after a vehicle startup event; and selectively indicating that an engine heater was used before the vehicle startup event based on the derivative.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
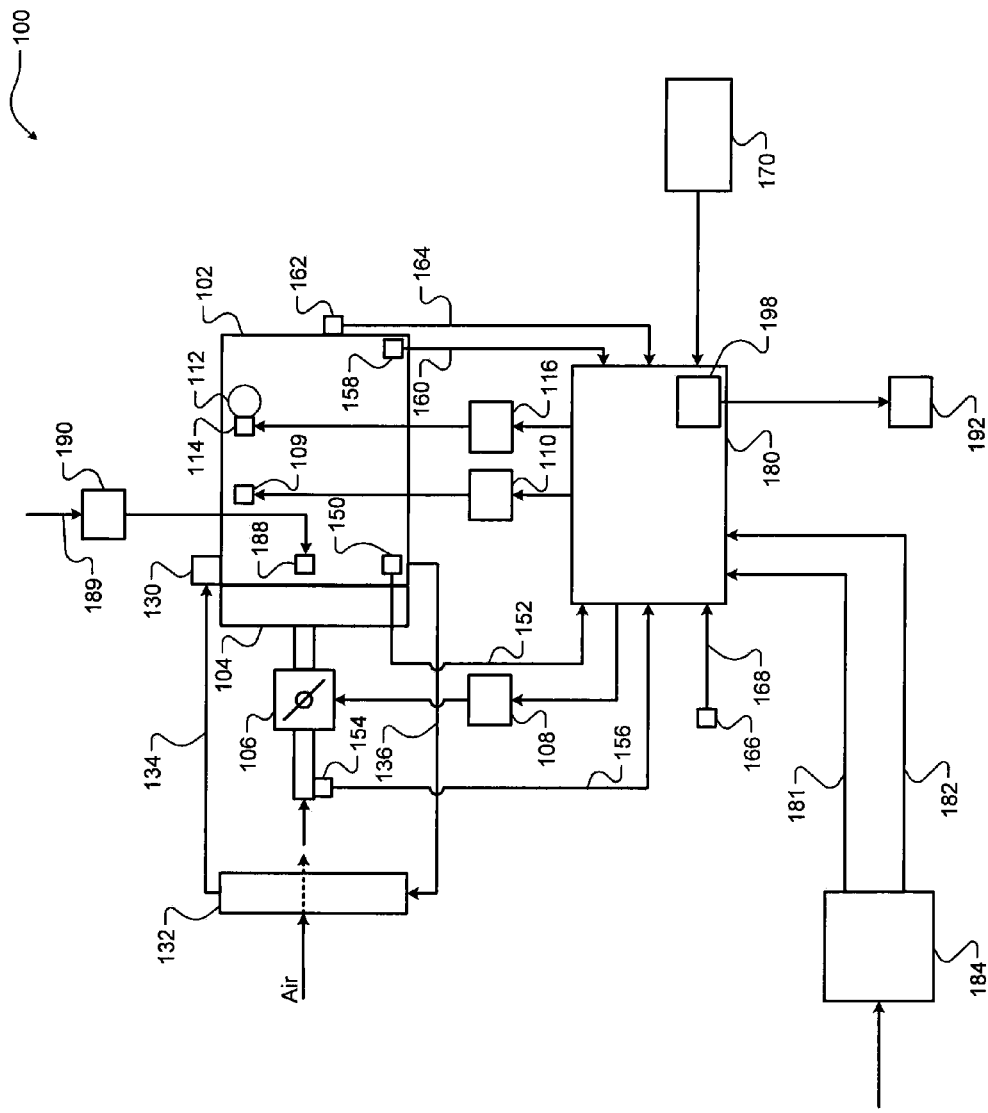
FIG. 1 is a functional block diagram of an exemplary engine control system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A coolant pump of a vehicle circulates coolant between a heat exchanger and an engine while the engine is running. While the vehicle is shut down, an engine heater may selectively be used to warm the engine. Warming the engine while the vehicle is shut down may, for example, facilitate engine startup in cold weather conditions.

A temperature sensor diagnostic module selectively diagnoses a fault in one or more temperature sensors of the vehicle after an engine startup. More specifically, the temperature sensor diagnostic module selectively diagnoses the fault based on a comparison of two or more temperatures measured when the temperatures should be approximately equal. For example only, the temperatures should be approximately equal when the engine is started after the vehicle has been shut down for a predetermined period.

Use of the engine heater while the vehicle is shut down, however, may cause one or more of the temperatures to be greater than one or more of the other temperatures when the engine is started. Accordingly, the temperature sensor diagnostic module may incorrectly diagnose a fault in one or more of the sensors when the engine heater is used while the vehicle is shut down.

A heater use detection module according to the present disclosure selectively detects use of the heater while the vehicle was shut down based on a derivative of a temperature of a fluid of the engine or a material of the engine measured by a temperature sensor. For example only, the temperature sensor may be a coolant temperature sensor, an oil temperature sensor, a metal temperature sensor, or another suitable temperature sensor associated with the engine. The heater use detection module selectively detects the use of the heater when the derivative is less than (i.e., more negative than) a predetermined negative derivative value. When the derivative is less than the predetermined negative derivative value, the temperature measured by the temperature sensor is decreasing. The decreasing temperature (and the negative derivative) indicates that the fluid or material was previously warmer and, therefore, that the engine heater was used while the vehicle was shut down.

Referring now to FIG. 1, a functional block diagram of an exemplary engine system 100 of a vehicle is presented. An engine 102 generates drive torque for the vehicle. The engine 102 will be discussed as including a spark-combustion engine, but the engine 102 may include another suitable type of engine, such as a compression-combustion engine. The vehicle may additionally or alternatively include one or more motors or motor/generators.

Air is drawn into the engine 102 through an intake manifold 104. The volume of air drawn into the engine 102 may be varied by a throttle valve 106. A throttle actuator module 108 (e.g., an electronic throttle controller) controls opening of the throttle valve 106. One or more fuel injectors, such as fuel injector 109, mix fuel with the air to form a combustible air/fuel mixture. A fuel actuator module 110 controls the fuel injectors.

A cylinder 112 includes a piston (not shown) that is coupled to a crankshaft (not shown). Although the engine 102 is depicted as including only the cylinder 112, the engine 102 may include more than one cylinder. Combustion of the air/fuel mixture may include four-strokes: an intake stroke, a compression stroke, a combustion (or expansion) stroke, and an exhaust stroke. During the intake stroke, the piston is lowered to a bottom most position and the air and fuel are introduced into the cylinder 112. The bottom most position may be referred to as a bottom dead center (BDC) position.

During the compression stroke, the crankshaft drives the piston toward a top most position, thereby compressing the air/fuel mixture within the cylinder 112. The top most position may be referred to as a top dead center (TDC) position.

A spark plug 114 is selectively energized to ignite the air/fuel mixture during the expansion stroke. A spark actuator module 116 controls the energization of the spark plug 114. Combustion of the air/fuel mixture drives the piston toward the BDC position, thereby rotatably driving the crankshaft. The rotational force (i.e., torque) about the crankshaft may be the compressive force that compresses the air/fuel mixture during the compression stroke of a next cylinder in a predetermined firing order. Exhaust gas resulting from the combustion of the air/fuel mixture is expelled from the cylinder 112 during the exhaust stroke.

Combustion of the air/fuel mixture generates heat. A coolant pump 130 circulates a coolant and/or one or more other suitable fluids (hereafter "the coolant") through a plurality of coolant channels (not shown) formed within the engine 102 while the engine 102 is running. For example only, the coolant pump 130 may include a switchable coolant pump, an engine (e.g., crankshaft) driven coolant pump, or another suitable type of coolant pump.

Cooling the engine 102 with the coolant is a cyclical process. While the engine 102 is running, the coolant pump 130 draws the (generally colder) coolant from a heat exchanger 132 (e.g., a radiator) and/or a coolant reservoir (not shown) via a first coolant line 134. The coolant pump 130 circulates the coolant through the coolant channels, and the coolant absorbs heat from the engine 102. The coolant pump 130 circulates the (then warmer) coolant back to the heat exchanger 132 and/or to the coolant reservoir via a second coolant line 136. The heat exchanger 132 facilitates the transfer of heat from the coolant to air passing the heat exchanger 132. In this manner, the coolant is cooled for re-circulation back to the engine 102.

A coolant temperature sensor 150 measures temperature of the coolant and generates a coolant temperature signal 152 based on the coolant temperature. An intake air temperature (IAT) sensor 154 measures temperature of air flowing through the throttle valve 106 and generates an IAT signal 156 based on the IAT. An oil temperature sensor 158 measures temperature of engine oil and generates an oil temperature signal 160 based on the oil temperature.

A metal temperature sensor 162 measures temperature of a metal component of the engine 102 and generates a metal temperature signal 164 based on the metal temperature. For example only, the metal component may include an engine block, a cylinder head, or another suitable metal component. An ambient temperature sensor 166 measures temperature of ambient air and generates an ambient temperature signal 168 based on the ambient air temperature. The engine system 100 may also include one or more other sensors 170, such as an engine speed (e.g., RPM) sensor, a mass air flowrate (MAF) sensor, a manifold absolute pressure (MAP) sensor, and/or one or more other suitable sensors.

After the vehicle (and therefore the engine 102) is shut down, the coolant temperature, the oil temperature, and the metal temperature may approach the ambient air temperature. If the vehicle is shut down for at least a predetermined cold start period, the coolant temperature, the oil temperature, the IAT, and the metal temperature should become approximately equal to the ambient air temperature. A vehicle startup (and therefore engine startup) performed when the vehicle has been shut down for at least the predetermined cold start period may be referred to as a cold start event.

An engine control module (ECM) 180 controls the torque output by the engine 102. The ECM 180 also controls starting of the engine 102 and shutting down of the engine 102. The ECM 180 starts and shuts down the engine 102 when a vehicle startup command 181 and a vehicle shutdown command 182 is received, respectively. The ECM 180 may also selectively start and shut down the engine 102 when an engine startup command (not shown) and an engine shutdown command (not shown) is received, respectively, for example, for hybrid vehicle operation.

A driver input module 184 selectively generates the vehicle startup command 181 and the vehicle shutdown command 182 based on user inputs. For example only, the driver input module 184 may generate the vehicle startup command 181 when a user actuates an ignition key to a vehicle startup position, when the user presses a button, and/or when the user otherwise starts the vehicle. The driver input module 184 may generate a vehicle shutdown command, for example, when the user actuates the ignition key to a vehicle shutdown position while the vehicle is running, when the user presses a button, and/or when the user otherwise shuts down the vehicle.

A heater 188 may be supplied input power 189 and operated while the vehicle is shut down. A heater actuator module 190 may vary the amount of input power 189 supplied to the heater 188. The input power 189 may be from, for example only, a power supply of the vehicle (e.g., a battery), an external power supply (e.g., a wall outlet), or another suitable source of power. The heater 188 may include a resistive heater or another suitable type of heater. The heater 188 may be referred to as a block heater or an engine heater in various implementations. For example only, the heater 188 may be disposed in a coolant path of the engine 102, in an oil path of the engine 102, or be fixed to a metal component of the engine 102.

When the heater 188 is ON, the heater 188 may warm the coolant, the oil, and one or more engine components while the vehicle is shut down. The warming provided by the heater 188 may aid in vaporization of injected fuel, may decrease the viscosity of the oil and the coolant, and/or provide one or more other benefits. In this manner, the use of the heater 188 while the vehicle is shut down may provide a more desirable engine startup for cold start events.

While the engine 102 is running after a cold start event, the ECM 180 may selectively diagnose a fault in one or more of the temperature sensors of the vehicle. For example only, the ECM 180 may diagnose the fault based on a comparison of two or more of the oil temperature, the intake air temperature, the coolant temperature, the ambient air temperature, and the metal temperature. As the temperatures should be approximately equal after a cold start event, the ECM 180 may diagnose the fault in a given temperature sensor when the temperature measured by the given temperature sensor is not plausible when compared to one or more of the other temperatures. The ECM 180 may illuminate a malfunction indicator lamp (MIL) 192, set a predetermined code indicative of the fault in memory (not shown), and/or perform one or more other remedial actions when the fault is diagnosed.

The operation of the heater 188 when the vehicle is shut down, however, may cause one or more of the temperatures used in diagnosing the fault to be greater than one or more of the other temperatures. For example only, in implementations where the heater 188 is located in a coolant path, operation of the heater 188 while the vehicle is shut down may cause the coolant temperature to be greater than one or more of the other temperatures. Accordingly, operation of the heater 188 while the vehicle is shut down may cause the ECM 180 to incorrectly diagnose the fault in one of the temperature sensors.

The ECM 180 may include a heater use detection module 198. When a cold start event is performed, the heater use detection module 198 determines whether the heater 188 was used during the period that the vehicle was shut down before the cold start event. The heater use detection module 198 of the present disclosure determines whether the heater 188 was used while the vehicle was shut down based on a derivative of one of the measured temperatures, such as the coolant temperature. For example only, the heater use detection module 198 selectively determines that the heater 188 was used while the vehicle was shut down when the derivative of the coolant temperature is less than (i.e., more negative than) a predetermined negative derivative value.

Figure 2:
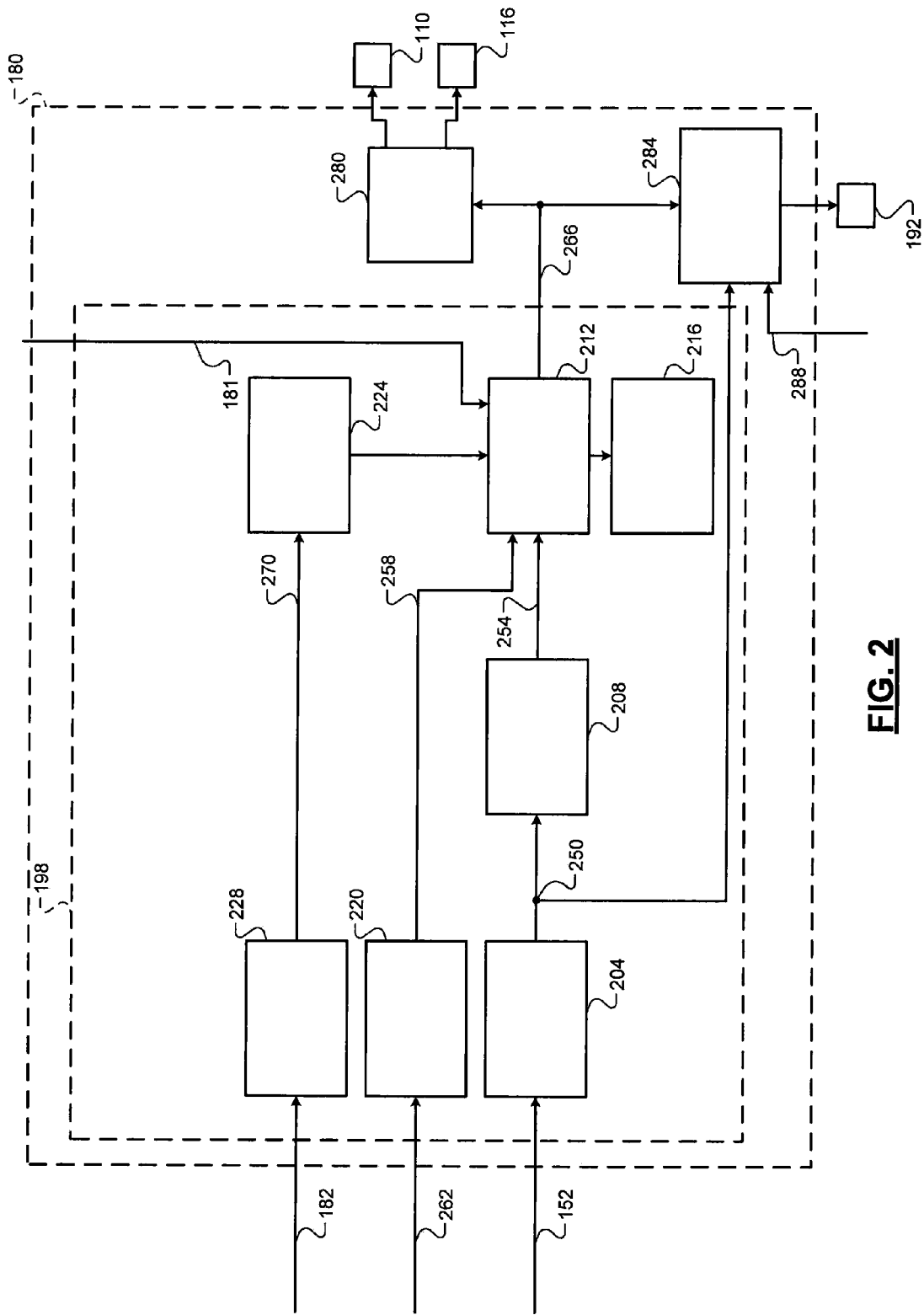
FIG. 2 is a functional block diagram of an exemplary engine control module including a heater use detection module according to the principles of the present disclosure.

Referring now to FIG. 2, a functional block diagram of an exemplary implementation of the ECM 180 including the heater use detection module 198 is presented. While the heater use detection module 198 is shown and discussed as being implemented within the ECM 180, the heater use detection module 198 may be implemented in another suitable module or independently.

The heater use detection module 198 may include a temperature module 204, a derivative module 208, a heater use indicator module 212, and a counter module 216. The heater use detection module 198 may also include an engine ON timer module 220, an enabling/disabling module 224, and an engine OFF timer module 228.

The temperature module 204 receives a temperature signal from a temperature sensor. While the temperature module 204 is shown and will be discussed as receiving the coolant temperature signal 152 from the coolant temperature sensor 150, the temperature module 204 may receive a temperature signal from another one of the temperature sensors in other implementations. For example only, the temperature module 204 may receive the oil temperature signal 160 from the oil temperature sensor 158.

The temperature module 204 may sample the coolant temperature signal 152 at a predetermined sampling rate, such as once per second. The temperature module 204 may also, for example, filter, buffer, and/or digitize the coolant temperature signal 152. The temperature module 204 may provide the coolant temperature samples 250 to the derivative module 208.

The derivative module 208 determines coolant temperature derivatives 254. When one of the coolant temperature samples 250 is received, the derivative module 208 may determine a given one of the coolant temperature derivatives 254 based on a difference between the coolant temperature sample 250 and a previous one of the coolant temperature samples 250 divided by the predetermined sampling rate. In various implementations, the derivative module 208 may alternatively determine the coolant temperature derivatives 254 based on first-order mathematical derivatives of the coolant temperature signal 152, respectively, at the predetermined sampling rate.

After the engine 102 is started pursuant to the vehicle startup command 181, the heater use indicator module 212 selectively determines whether the heater 188 was used during the period that the vehicle was shut down. The period includes the period between a time when the last vehicle shutdown command 182 was received and the time when the vehicle startup command 181 was received. The heater use indicator module 212 determines whether the heater 188 was used during the period based on one or more of the coolant temperature derivatives 254.

More specifically, the heater use indicator module 212 increments a counter in the counter module 216 each time that one of the coolant temperature derivatives 254 is less than (i.e., more negative than) a predetermined negative derivative value. The heater use indicator module 212 resets the counter each time that one of the coolant temperature derivatives 254 is greater than the predetermined negative derivative value. The counter value therefore tracks the number of consecutive coolant temperature derivatives 254 that have been less than the predetermined negative derivative value. For example only, the predetermined negative derivative value may be approximately −0.4° C./second.

The coolant temperature derivative 254 being less than the predetermined negative derivative value indicates that (relatively) cooler coolant is being drawn into proximity of the coolant temperature sensor 150. As all of the coolant should be approximately the same temperature when a cold start event is performed, the coolant being relatively cooler shortly after the engine 102 is started may indicate that heat distribution was non-homogenous. Therefore, it can be inferred that the heater 188 was used during the period while the vehicle was shut down.

The heater use indicator module 212 monitors the counter. The heater use indicator module 212 selectively determines that the heater 188 was used while the vehicle was shut down based on the counter value. More specifically, the heater use indicator module 212 determines that the heater 188 was used while the vehicle was shut down when the counter value is greater than a predetermined value. In this manner, the heater use indicator module 212 determines that the heater 188 was used while the vehicle was shut down when at least a predetermined number (equal to the predetermined value) of consecutive coolant temperature derivatives 254 are less than the predetermined negative derivative value. For example only, the predetermined value may be approximately 4.

The heater use indicator module 212 also monitors an engine ON period 258. The engine ON timer module 220 includes an engine ON timer that tracks the engine ON period 258. The engine ON period 258 corresponds to the period that the engine 102 has been running after the vehicle startup command 181 was received. The engine ON timer module 220 may reset the engine ON timer when the vehicle startup command 181 is received. The engine ON timer module 220 may start the engine ON timer after the engine 102 is deemed running, such as when an engine speed 262 is greater than a predetermined speed. For example only, the predetermined speed may be approximately 400 revolutions per minute (RPM).

The heater use indicator module 212 may selectively determine that the heater 188 was not used while the vehicle was shut down when the engine ON period 258 is greater than a predetermined period. In this manner, if the counter value does not exceed the predetermined value before the engine ON period 258 exceeds the predetermined period, the heater use indicator module 212 may determine that the heater 188 was not used. For example only, the predetermined period may be approximately 60 seconds.

The heater use indicator module 212 generates a heater use signal 266 that indicates whether the heater 188 was used during the period while the vehicle was shut down. For example only, the heater use indicator module 212 may set the heater use signal 266 to an active state (e.g., 5 Volts) when the heater 188 was used while the vehicle was shut down. The heater use indicator module 212 may otherwise set the heater use signal 266 to an inactive (e.g., 0 Volts) state.

The enabling/disabling module 224 selectively enables or disables the heater use indicator module 212. The enabling/disabling module 224 selectively enables or disables the heater use indicator module 212 based on an engine OFF period 270. More specifically, the enabling/disabling module 224 disables the heater use indicator module 212 when the engine OFF period 270 is less than the predetermined cold start period. Written conversely, the enabling/disabling module 224 may enable the heater use indicator module 212 when the engine OFF period 270 is greater than the predetermined cold start period. For example only, the predetermined cold start period may be approximately 8 hours.

The engine OFF timer module 228 includes an engine OFF timer that tracks the engine OFF period 270. The engine OFF timer module 228 may reset the engine OFF timer and start the engine OFF timer when the last vehicle shutdown command 182 is received. In this manner, the engine OFF period 270 corresponds to the period that the vehicle (and therefore the engine 102) is shut down after the last vehicle shutdown command 182 is received.

The ECM 180 may include an actuator control module 280 and a temperature sensor diagnostic module 284. The actuator control module 280 controls one or more engine actuators, such as the fuel actuator module 110 and the spark actuator module 116. The actuator control module 280 may determine target actuator values for each of the engine actuators, and the actuator modules may control the engine actuators to achieve the target actuator values, respectively.

The actuator control module 280 may control one or more of the engine actuators based on the heater use signal 266 in various implementations. For example only, the actuator control module 280 may control the fuel actuator module 110 and the spark actuator module 116 based on the heater use signal 266. More specifically, the actuator control module 280 may selectively adjust fuel injection timing and/or an amount of fuel injected based on the heater use signal 266. The actuator control module 280 may additionally or alternatively selectively adjust spark timing based on the heater use signal 266. Adjusting the fuel injection timing, the amount of fuel injected, and/or the spark timing based on the heater use signal 266 may provide increased engine operation.

The temperature sensor diagnostic module 284 selectively diagnoses the fault in one or more of the temperature sensors of the vehicle. The temperature sensor diagnostic module 284 selectively diagnoses the fault while the engine 102 is running after a cold start event. When a fault is diagnosed in a temperature sensor, the temperature sensor diagnostic module 284 may set a predetermined code indicative of the fault in memory (not shown), illuminate the MIL 192, and/or perform one or more other remedial actions.

The temperature sensor diagnostic module 284 may selectively diagnose the fault based on a comparison of the coolant temperature samples 250 and the samples of one or more other temperature signals 288, such as samples of the ambient temperature signal 168, the IAT signal 156, the oil temperature signal 160, and/or the metal temperature signal 164. For example only, the temperature sensor diagnostic module 284 may diagnose the fault in one of the temperature sensors when the temperature measured by that temperature sensor is different than two or more of the other temperatures by more than a predetermined amount or percentage.

As use of the heater 188 while the vehicle is shut down may increase one or more of the temperatures, the temperature sensor diagnostic module 284 may incorrectly diagnose the fault when the heater 188 was used while the vehicle was shut down. Accordingly, the temperature sensor diagnostic module 284 may selectively disable diagnosing the fault based on the heater use signal 266. More specifically, the temperature sensor diagnostic module 284 may disable diagnosing the fault when the heater 188 was used while the vehicle was shut down.

Figure 3:
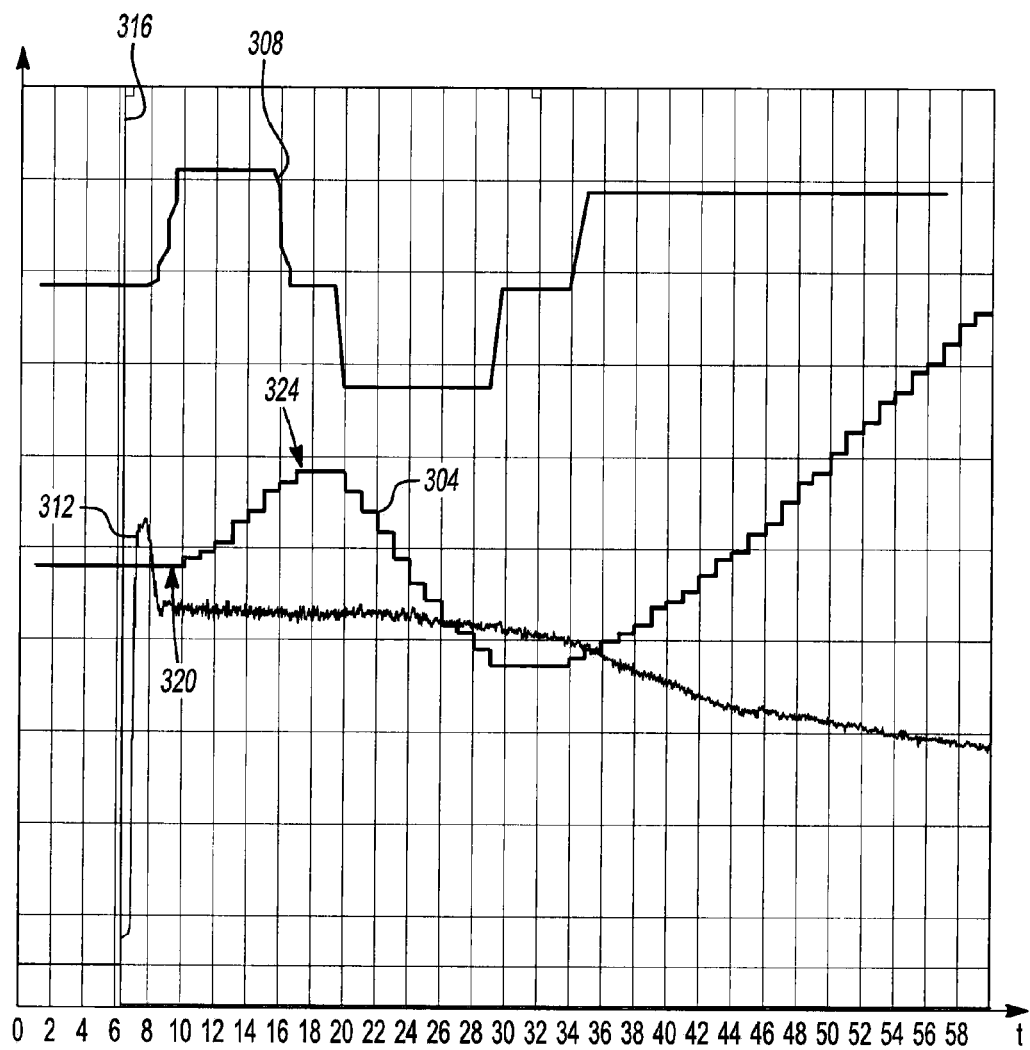
FIG. 3 is an exemplary graph of coolant temperature as a function of time, coolant temperature derivative as a function of time, and engine speed as a function of time according to the principles of the present disclosure.

Referring now to FIG. 3, an exemplary graph of coolant temperature 304, coolant temperature derivative 308, and engine speed 312 as a function of time is presented. A cold start event is initiated at approximately time 316. The heater 188 was used during the period between the time when the last vehicle shutdown command 182 was received and time 316. Engine cranking begins at approximately time 316, and the engine speed 312 increases.

The coolant circulates while the engine 102 runs after time 316. In the illustration of FIG. 3, the coolant temperature 304 initially increases as illustrated at 320. The increase may be due to the heater 188 being disposed upstream of the coolant temperature sensor 150 in an exemplary engine. The coolant temperature 304 plateaus as illustrated at 324 before decreasing as colder coolant is drawn to the location of the coolant temperature sensor 150.

The heater use indicator module 212 determines that the heater 188 was used while the vehicle was shut down before time 316 based on the coolant temperature derivative 308. More specifically, the heater use indicator module 212 determines that the heater 188 was used while the vehicle was shut down before time 316 when the predetermined number of the coolant temperature derivatives 308 are less than the predetermined negative derivative value.

Figure 4:
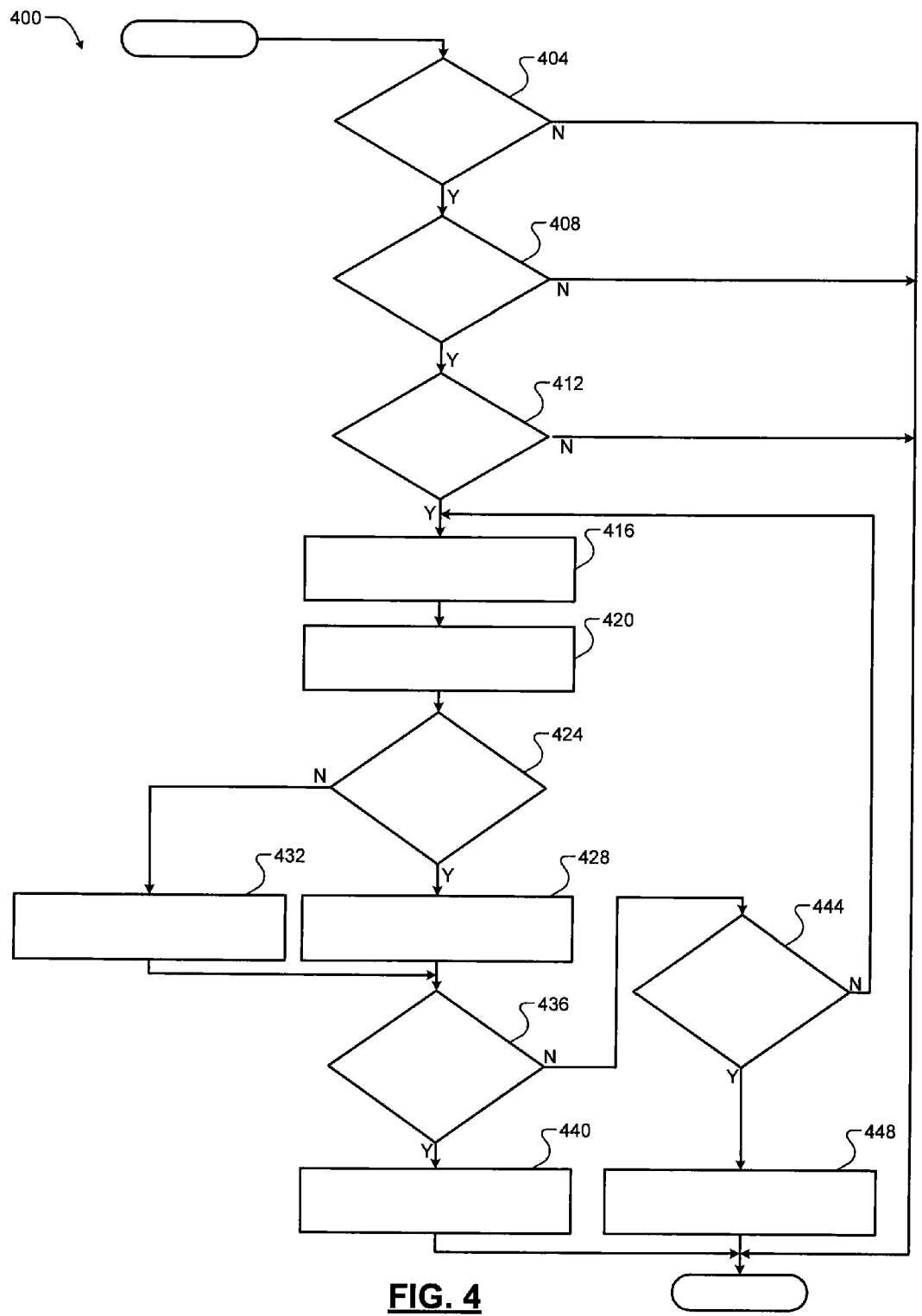
FIG. 4 is a flowchart depicting an exemplary method of detecting when an engine heater was used while a vehicle was shut down according to the principles of the present disclosure.

Referring now to FIG. 4, a flowchart depicting an exemplary method 400 of detecting when the heater 188 was used while the vehicle was shut down is presented. Control begins with 404 where control determines whether the vehicle startup command 181 has input. If true, control continues with 408; if false, control may end. Control may determine whether the engine OFF period 270 is greater than the predetermined cold start period at 408. If true, control continues with 412; if false, control may end. For example only, the predetermined cold start period may be approximately 8 hours.

At 412, control determines whether the engine 102 is running. If true, control continues with 416; if false, control may end. For example only, control may selectively determine that the engine 102 is running when the engine speed 262 is greater than the predetermined speed. Control increments the engine ON timer at 416. In this manner, the engine ON period 258 tracks the period that the engine 102 has been running after the vehicle startup command 181 is received. Control may also reset the engine ON timer to a predetermined reset value, such as zero, before incrementing the engine ON timer at 416.

Control determines the coolant temperature derivative 254 at 420. Control determines whether the coolant temperature derivative 254 is less than the predetermined negative derivative value at 424. If true, control increments the counter at 428 and continues with 436; if false, control resets the counter at 432 and continues with 436. The counter tracks the number of consecutive ones of the coolant temperature derivative 254 that are less than the predetermined negative derivative value. For example only, the predetermined negative derivative value may be approximately −0.4° C./second.

At 436, control determines whether the counter is greater than the predetermined value. If true, control may indicate that the heater 188 was used while the vehicle was shut down at 440 and control may end; if false, control may continue with 444. For example only, the predetermined value may be approximately 4.

Control may determine whether the engine ON period 258 is greater than the predetermined period at 444. If true, control may indicate that the heater 188 was not used while the vehicle was shut down at 448 and control may end; if false, control may return to 416. For example only, the predetermined period may be approximately 60 seconds.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system comprising:
a temperature derivative module that determines a derivative of a temperature of one of a fluid of an engine of a vehicle and a component of the engine measured by a temperature sensor after a vehicle startup event; and
a heater use indicator module that selectively indicates that an engine heater was used before the vehicle startup event based on the derivative.

2. The diagnostic system of claim 1 wherein the heater use indicator module indicates that the engine heater was used when the derivative is less than a predetermined negative value.

3. The diagnostic system of claim 1 wherein the temperature derivative module determines the derivative of a coolant temperature measured by a coolant temperature sensor after the vehicle startup event.

4. The diagnostic system of claim 1 wherein the temperature derivative module determines the derivative of an oil temperature measured by an oil temperature sensor after the vehicle startup event.

5. The diagnostic system of claim 1 further comprising:
an engine OFF timer module that determines a period that the engine was shut down before the vehicle startup event; and
a disabling module that disables the heater use indicator module when the period is less than a predetermined period.

6. The diagnostic system of claim 1 further comprising:
an engine ON timer module that determines a period that the engine has been running after the vehicle startup event,
wherein the heater use indicator module selectively indicates that the engine heater was not used before the vehicle startup event based on the period.

7. The diagnostic system of claim 6 wherein the heater use indicator module indicates that the engine heater was not used before the vehicle startup event when the period is greater than a predetermined period.

8. The diagnostic system of claim 1 further comprising an actuator control module that adjusts at least one of a fuel injection timing and a fuel injection amount based on the indication.

9. The diagnostic system of claim 1 further comprising an actuator control module that adjusts a spark timing based on the indication.

10. The diagnostic system of claim 1 further comprising a temperature sensor diagnostic module that selectively diagnoses a fault in at least one of the temperature sensor and N other temperature sensors associated with the engine based on a comparison of the temperature and N other temperatures measured by the N other temperature sensors after the vehicle startup event, respectively,
wherein N is an integer greater than zero, and
wherein the temperature sensor diagnostic module selectively disables the diagnosis based on the indication.

11. A diagnostic method comprising:
determining a derivative of a temperature of one of a fluid of an engine of a vehicle and a component of the engine measured by a temperature sensor after a vehicle startup event; and
selectively indicating that an engine heater was used before the vehicle startup event based on the derivative.

12. The diagnostic method of claim 11 further comprising indicating that the engine heater was used when the derivative is less than a predetermined negative value.

13. The diagnostic method of claim 11 further comprising determining the derivative of a coolant temperature measured by a coolant temperature sensor after the vehicle startup event.

14. The diagnostic method of claim 11 further comprising determining the derivative of an oil temperature measured by an oil temperature sensor after the vehicle startup event.

15. The diagnostic method of claim 11 further comprising:
determining a period that the engine was shut down before the vehicle startup event; and disabling the selective indication that the engine heater was used when the period is less than a predetermined period.

16. The diagnostic method of claim 11 further comprising:
determining a period that the engine has been running after the vehicle startup event; and
selectively indicating that the engine heater was not used before the vehicle startup event based on the period.

17. The diagnostic method of claim 16 further comprising indicating that the engine heater was not used before the vehicle startup event when the period is greater than a predetermined period.

18. The diagnostic method of claim 11 further comprising adjusting at least one of a fuel injection timing and a fuel injection amount based on the indication.

19. The diagnostic method of claim 11 further comprising adjusting a spark timing based on the indication.

20. The diagnostic method of claim 11 further comprising:
selectively diagnosing a fault in at least one of the temperature sensor and N other temperature sensors associated with the engine based on a comparison of the temperature and N other temperatures measured by the N other temperature sensors after the vehicle startup event, respectively,
wherein N is an integer greater than zero; and
selectively disabling the diagnosis based on the indication.

* * * * *